(12) United States Patent
Thomsen et al.

(10) Patent No.: US 11,619,935 B2
(45) Date of Patent: Apr. 4, 2023

(54) METHODS OF CONTROLLING A MOBILE ROBOT DEVICE FROM ONE OR MORE REMOTE USER DEVICES

(71) Applicant: Blue Ocean Robotics Aps, Odense (DK)

(72) Inventors: Laust Randeris Thomsen, Odense (DK); Efraim Vitzrabin, Odense (DK); John Erland Østergaard, Odense (DK); Thomas Rubæk, Odense (DK)

(73) Assignee: Blue Ocean Robotics ApS, Odense (DK)

( * ) Notice: Subject to any disclaimer, the term of this patent is extended or adjusted under 35 U.S.C. 154(b) by 152 days.

(21) Appl. No.: 16/932,440

(22) Filed: Jul. 17, 2020

(65) Prior Publication Data

US 2022/0019215 A1 Jan. 20, 2022

(51) Int. Cl.
*G05D 1/00* (2006.01)
*H04L 67/12* (2022.01)
*H04N 7/18* (2006.01)

(52) U.S. Cl.
CPC ........... *G05D 1/0022* (2013.01); *H04L 67/12* (2013.01); *H04N 7/181* (2013.01)

(58) Field of Classification Search
None
See application file for complete search history.

(56) References Cited

U.S. PATENT DOCUMENTS

| 6,535,793 B2 | 3/2003 | Allard |
| 8,265,793 B2 | 9/2012 | Cross |
| 8,543,842 B2 | 9/2013 | Ginter |
| 8,682,486 B2 | 3/2014 | Wang |
| 9,283,674 B2 | 3/2016 | Hoffman |
| 9,688,399 B1 * | 6/2017 | Dobbins .......... H04N 21/42208 |

(Continued)

FOREIGN PATENT DOCUMENTS

| TW | M553858 | 1/2018 |
| TW | 201808387 A | 3/2018 |

(Continued)

OTHER PUBLICATIONS

Extended European Search Report for App. No. EP20189483.9 dated Dec. 21, 2020, 10 pages.

(Continued)

*Primary Examiner* — James M Anderson, II
(74) *Attorney, Agent, or Firm* — Kevin Roddy; Butzel Long (57) ABSTRACT

Implementations of the disclosed subject matter provide methods of transmitting, from a first user device, an authorization to one or more other user devices to receive one or more images captured by a first sensor of a mobile robot device, where the first user device controls the mobile robot device. The first user device may receive acknowledgement from the one or more other user devices to receive the one or more images captured by the first sensor of the mobile robot device. The mobile robot device may transmit, to the first user device and the one or more other user devices based on the acknowledgement, the one or more first images captured by the first sensor of the mobile robot as the mobile robot device moves within the area based on at least one first control operation received from the first user device.

19 Claims, 9 Drawing Sheets

(56) References Cited

U.S. PATENT DOCUMENTS

| | | | |
|---|---|---|---|
| 10,029,370 B2 | 7/2018 | Sutherland | |
| 2015/0016504 A1* | 1/2015 | Auyeung | H04N 19/162 |
| | | | 375/240.02 |
| 2016/0151917 A1 | 6/2016 | Faridi | |
| 2017/0041399 A1* | 2/2017 | Kokubo | H04L 67/125 |
| 2017/0361468 A1 | 12/2017 | Cheuvront | |
| 2018/0082308 A1 | 3/2018 | Gong | |
| 2018/0117761 A1 | 5/2018 | Meier | |
| 2018/0373239 A1* | 12/2018 | Tsubota | G05D 1/0268 |
| 2019/0265692 A1 | 8/2019 | Miyazaki | |
| 2020/0104522 A1 | 4/2020 | Collart | |

FOREIGN PATENT DOCUMENTS

| | | |
|---|---|---|
| TW | 201912125 A | 4/2019 |
| TW | M581257 | 7/2019 |
| TW | 201942734 A | 11/2019 |
| TW | 202008158 A | 2/2020 |

OTHER PUBLICATIONS

Taiwanese Office Action and Search Report for App. No. TW109126062, dated May 11, 2021, 9 pages.
European Patent Office Communication pursuant to Article 94(3) EPC issued in App. No. EP20189483.9, dated Jul. 27, 2022, 9 pages.

\* cited by examiner

METHODS OF CONTROLLING A MOBILE ROBOT DEVICE FROM ONE OR MORE REMOTE USER DEVICES

BACKGROUND

Current telepresence robots are typically controlled by a single remote operator, where visual information is transmitted from the robot to the remote operator. Using the visual information, the remote operator controls the movement of the robot in an area. Such telepresence robots do not typically allow for the remote operator to transfer control of the robot to another remote operator, or accept commands from more than one remote operator.

BRIEF SUMMARY

According to an implementation of the disclosed subject matter, a method may include transmitting from a first user device, via a communications network, an authorization to one or more other user devices to receive one or more images captured by a first sensor of a mobile robot device, where the first user device controls the mobile robot device. The first user device may receive, via the communications network, an acknowledgement from the one or more other user devices to receive the one or more images captured by the first sensor of the mobile robot device. The mobile robot device may transmit, to the first user device and the one or more other user devices based on the acknowledgement, the one or more first images captured by the first sensor of the mobile robot as the mobile robot device moves within the area based on at least one first control operation received from the first user device.

According to an implementation of the disclosed subject matter, a method may include receiving at a first user device, via a communications network, a request from one or more other user devices to receive one or more images captured by a sensor of the mobile robot device, where first user device controls a mobile robot device to move within an area. The first user device may transmit, via the communications network, a request grant to the one or more other user devices to receive the one or more images captured by the sensor of the mobile robot. The mobile robot device may transmit, to the first user device and the one or more other user devices based on the request grant, the one or more images captured by the sensor of the mobile robot as the mobile robot device moves within the area based on at least one first control operation received from the first user device.

According to an implementation of the disclosed subject matter, a method may include receiving, at a mobile robot device via a communications network from a first user device, at least one first control operation for the mobile robot device. The mobile robot device may receive, via the communications network from a second user device, at least one second control operation for the mobile robot device. The mobile robot device may transmit a request for approval of the at least one second control operation to the first mobile device. A grant request may be transmitted to the mobile robot device for the at least one second control operation of the second mobile device to control the mobile robot device.

Additional features, advantages, and implementations of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Implementations of the disclosed subject matter provide methods of controlling a mobile robot device, such as a telepresence mobile robot, from one or more remote user devices. The user of the remote user device may control the operations of the mobile robot device, may receive images and/or video from one or more sensors of the mobile robot device, and/or may receive audio signals that have been generated by a microphone of the mobile robot device. The remote user device may transmit audio signals to the mobile robot device to be output by one or more speakers, and may transmit images and/or video signals to the mobile robot device to be displayed on a display of the mobile robot device.

Implementations of the disclosed subject matter may provide methods for a first user device (i.e., a remote user device) to authorize a second user device to participate as a "passenger" by receiving images, video, audio, and/or other data from the mobile robot device as the first user device controls the movement mobile robot device in an area. The second user device may select to receive images and/or video from one or more sensors of the mobile robot device, where the images and/or video may be different from those transmitted to the first user device. The second user device may focus on portions of one or images and/or video transmitted from the mobile robot device. In some implementations, the second user device may request to control the operations of the mobile robot device from the first user device, and/or may jointly control the operations of the mobile robot device with the first user device. In some implementations, when the first user device and the second user device may control the mobile robot device, the mobile robot device receive and perform operations from each device, and/or may perform an operation based on the last received command.

In an example, mobile robot device may be deployed in a museum. A first user device may control the operation and/or movement of the mobile robot device in the museum. The first user device may authorize a second user device to receive images, video, and/or sound captured by sensors of the mobile robot device as the mobile robot device is controlled to move through the museum. The first user device may provide audio signals to the second user device regarding exhibits in the museum, and may control the images and/or video provided to the second user device. That is, the first user device may act as a tour guide to the second user device in the museum. The first user device may share display information with the second user device, such as in a separate screen of the second user device, and/or as an overlay to the images and/or video received from the mobile robot device.

In another example, the mobile robot device may be deployed in a hospital, or an operating room of the hospital. A doctor may operate the first user device, and may authorize a medical student, resident, nurse, or the like with the second user device to receive images, video, and/or audio signals from the mobile robot device. The first user device may control the mobile robot to move in the hospital to one or more patients, and the doctor may share a screen, patient information, and/or audio comments regarding patient treatment and/or surgery procedures on the patient to the second user device.

In yet another example, the mobile robot device may be deployed in an office building or a manufacturing facility. The mobile robot device may be deployed in a conference room of the office building where a meeting is occurring. The first user device may authorize a second user device to receive images, video, and/or audio signals from the mobile robot device that may capture the meeting. The first user device may provide additional information regarding the subject of the meeting to the second mobile device that may be presented alongside and/or overlaid on the images and/or video provided by the mobile robot device. For the manufacturing facility, the first user device may control the movement of the mobile robot in the manufacturing facility. The first user device may authorize the second user device to receive images, video, and/or audio signals from the mobile robot device as it moves about the manufacturing facility. The first user device may provide additional information regarding manufacturing and/or production of products the second mobile device that may be presented alongside and/or overlaid on the images and/or video provided by the mobile robot device.

Figure 1:
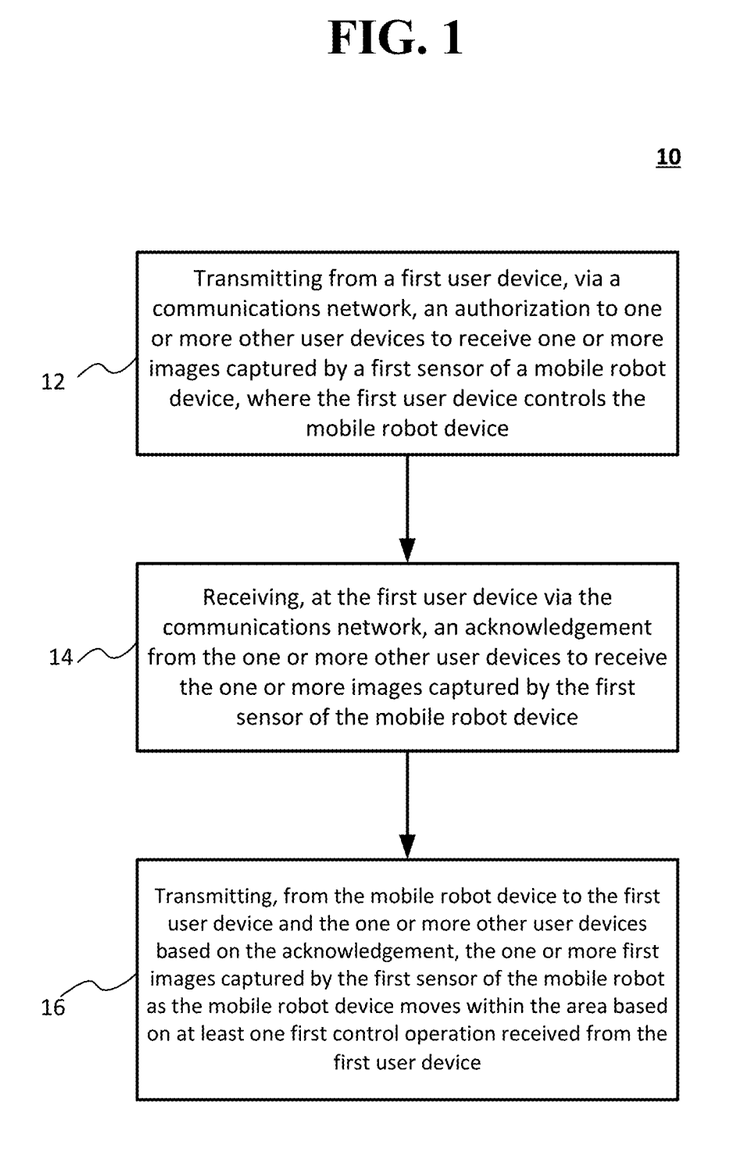
FIG. 1 shows an example method of authorizing, by a first user device that controls a mobile robot device, one or more other user devices to receive images captured by the mobile robot device according to an implementation of the disclosed subject matter.
Figure 7:
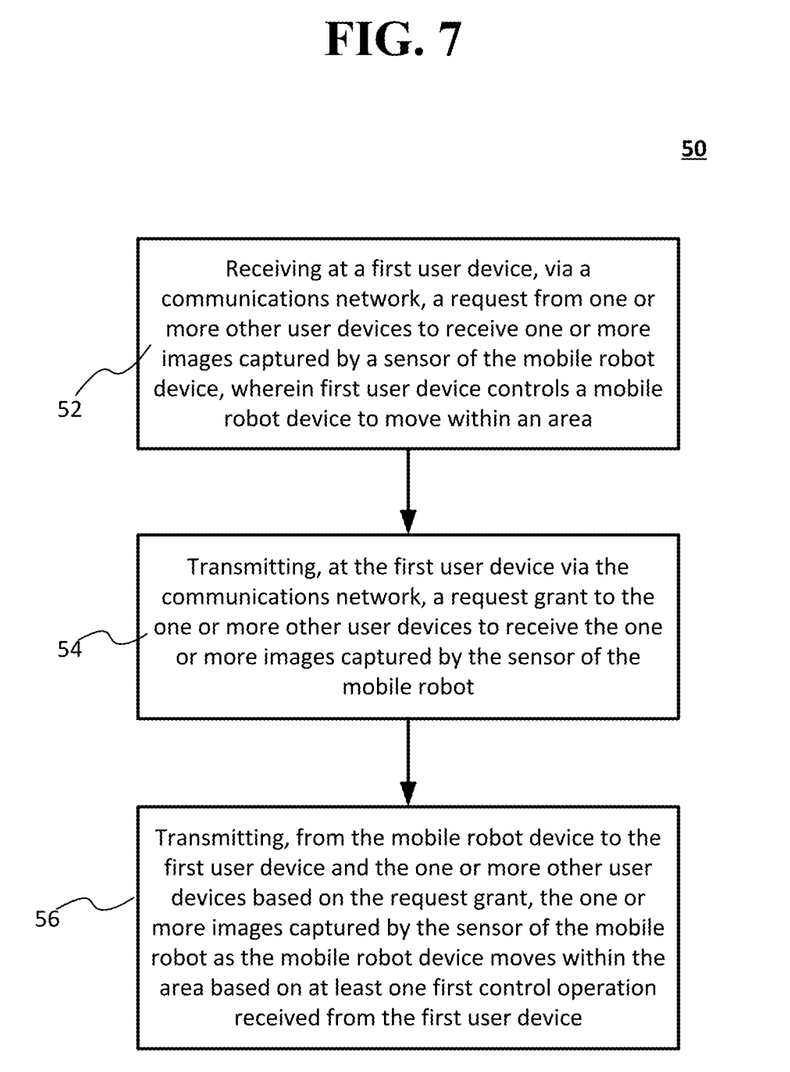
FIG. 7 shows an example method of receiving, at the first user device that controls the mobile robot device, a request from the one or more other user devices to receive images captured by the mobile robot device according to an implementation of the disclosed subject matter according to an implementation of the disclosed subject matter.

FIG. 1 shows an example method 10 of authorizing, by a first user device that controls a mobile robot device, one or more other user devices to receive images captured by the mobile robot device according to an implementation of the disclosed subject matter. A similar method 50 is shown in FIG. 7 and discussed in detail below, where the one or more other user devices request that the first user device transmit a request grant so that the one or more other user devices may receive the images captured by the mobile robot device.

Figure 9:
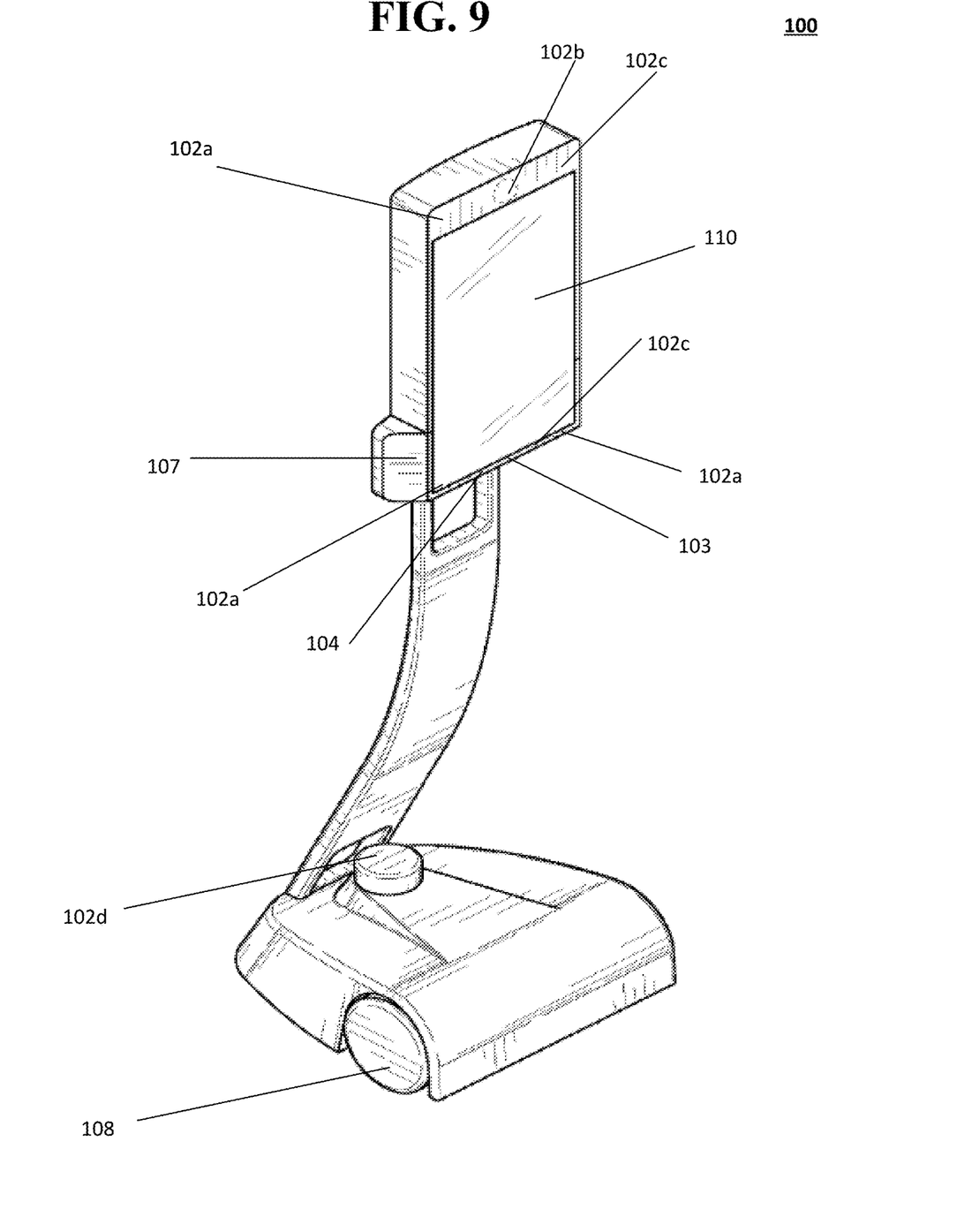
FIGS. 9-10 show an example mobile robot device according to an implementation of the disclosed subject matter.
Figure 10:
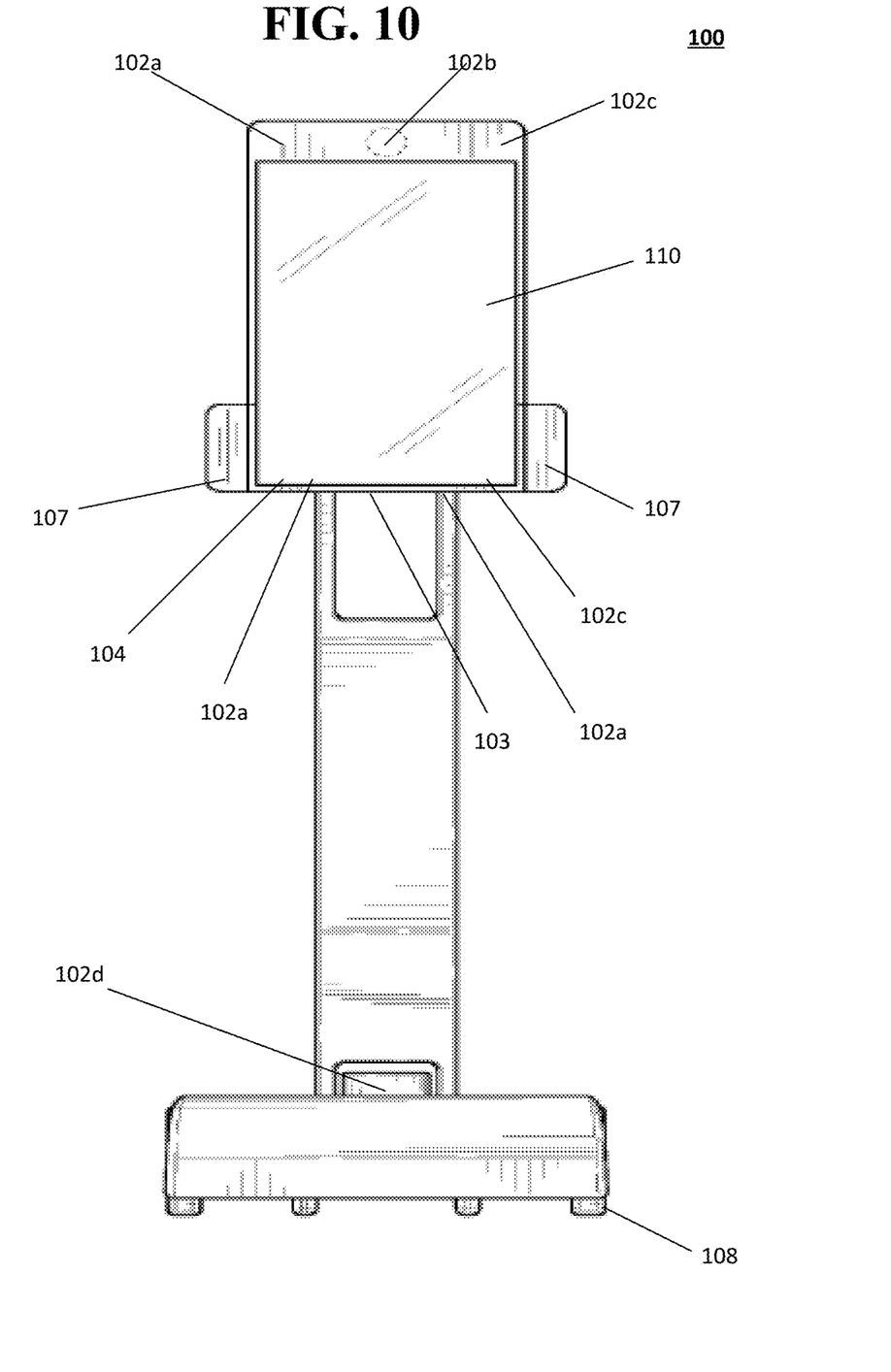
Figure 11:
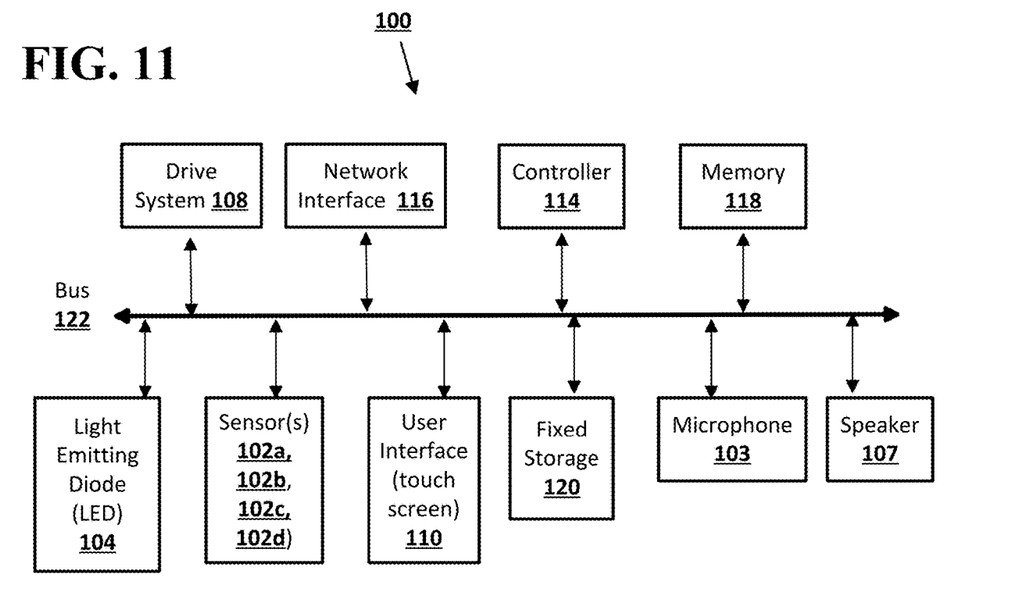
FIG. 11 shows an example configuration of the mobile robot of FIGS. 9-10 according to an implementation of the disclosed subject matter.

At operation 12 shown in FIG. 1, a first user device (e.g., remote user device 170 shown in FIG. 12) may transmit, via a communications network (e.g., network 130 shown in FIG. 12), an authorization to one or more other user devices (e.g., remote user device 180 shown in FIG. 12) to receive one or more images captured by a first sensor (e.g., sensor 102b, 102c shown in FIGS. 9-11 of a mobile robot device (e.g., mobile robot device 100 shown in FIGS. 9-12), where the first user device may control the mobile robot device. In some implementations, the first user device may authorize the one or more other user devices to receive video, audio signals, and other sensor data (e.g., data from sensors 102a, 102b, 102c, and/or 102d, and/or audio signals from the microphone 103 shown in FIGS. 9-11) from the mobile robot device.

At operation 14, the first user device may receive, via the communications network, an acknowledgement from the one or more other user devices to receive the one or more images captured by the first sensor of the mobile robot device. The acknowledgement may be an email, a text message, a signal, and/or any other electronic message.

At operation 16, the mobile robot device may transmit, to the first user device and the one or more other user devices based on the acknowledgement, the one or more first images captured by the first sensor of the mobile robot as the mobile robot device moves within the area based on at least one first control operation received from the first user device. That is, the users of the one or more other user devices may "ride along" by receiving images, video, and the like as the first user device controls the movement of the mobile robot device within the area.

Figure 2:
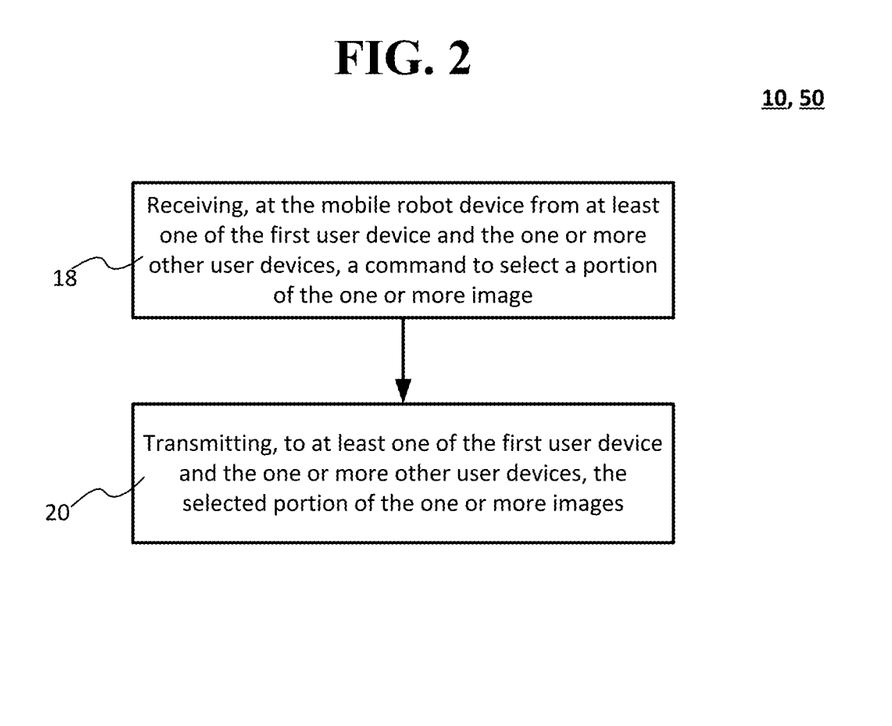
FIG. 2 shows that the methods of FIGS. 1 and 7 may include a method of selecting and transmitting portions of one or more images captured by the mobile robot device according to implementations of the disclosed subject matter.

FIG. 2 shows that the methods 10, 50 of FIGS. 1 and 7 may include a method of selecting and transmitting portions of one or more images captured by the mobile robot device according to implementations of the disclosed subject matter. At operation 18, the mobile robot device may receive, from at least one of the first user device and the one or more other user devices, a command to select a portion of the one or more image. For example, a user of a second user device (e.g., of the one or more other user devices) may make a selection (e.g., using a user interface of the second user device) to focus on a different portion of an image captured by a sensor of the mobile robot device than the user of the first user device. At operation 20, the selected portion of the one or more images may be transmitted to the first user device and/or the one or more other user devices.

In some implementations, the user of the second user device may select a different sensor (e.g., sensor 102a, 102b, 102c, and/or 102d, and/or microphone 103 shown in FIGS. 9-11) to receive images and/or data from than the user of the first user device. That is, the second user may view images, video, and the like from the mobile robot device independently of the first user device as the first user device controls the movement of the mobile robot device within the area.

Figure 3:
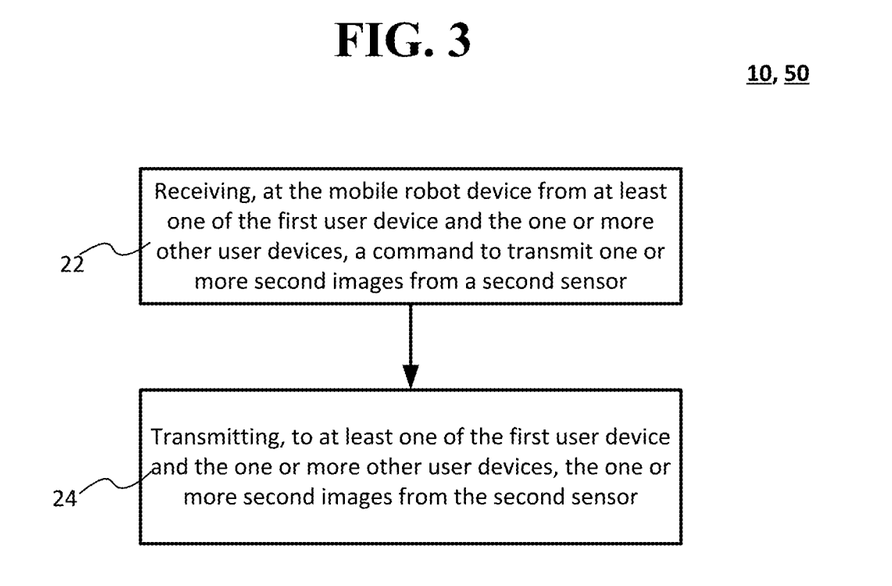
FIG. 3 shows that the methods of FIGS. 1 and 7 may include a method of transmitting one or more images based on a received command according to implementations of the disclosed subject matter.

FIG. 3 shows that the methods 10, 50 of FIGS. 1 and 7 may include a method of transmitting one or more images based on a received command according to implementations of the disclosed subject matter. At operation 22, the mobile robot device may receive, from at least one of the first user device and the one or more other user devices, a command to transmit one or more second images from a second sensor (e.g., sensor 102b, 102c). That is, the first user device and/or one or more of the other user devices may request that the mobile robot device transmit images, video, and/or other sensor data from a different sensor than was initially selected. The different sensor may provide different images and/or different viewpoints of the area that the mobile robot is operating in, and/or may provide different types of data (e.g., images, video, sound, distances between the mobile robot device and different objects in the area, audio signals, and the like). At operation 24, the one or more second images from the second sensor may be transmitted to the first user device (e.g., remote user device 170 shown in FIG. 12) and/or the one or more other user devices (e.g., remote user device 180 shown in FIG. 12). In some implementations, the second sensor may be a sensor other than an image sensor (e.g., a time-of-flight sensor, a LIDAR sensor, a microphone, or the like, as discussed below in connection with FIGS. 9-11), and may provide sensor data to the first user device and/or one or more of the other user devices.

Figure 4:
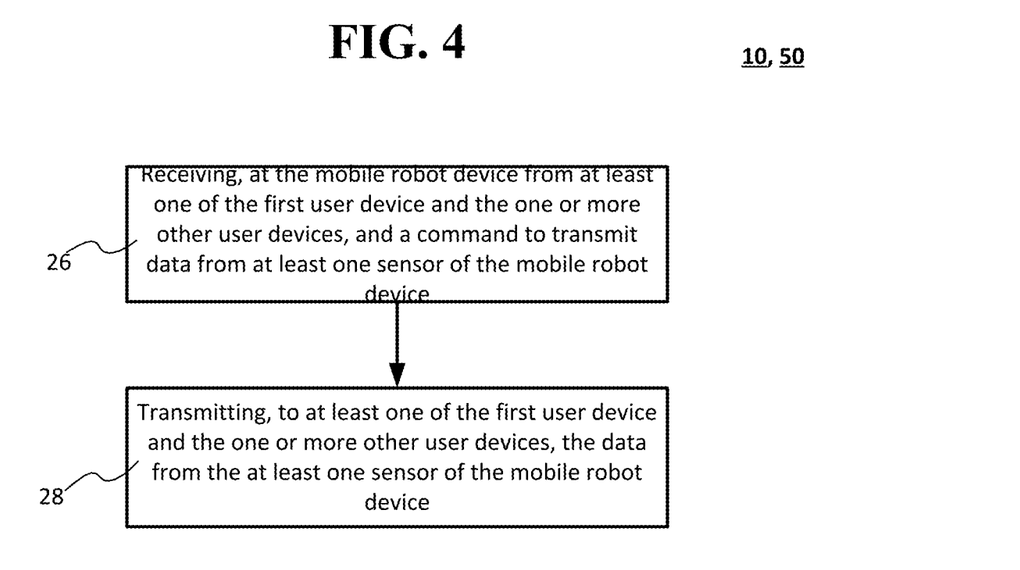
FIG. 4 shows that the methods of FIGS. 1 and 7 may include a method of transmitting data from the mobile robot device to one or more user device according to implementations of the disclosed subject matter.

FIG. 4 shows that the methods 10, 50 of FIGS. 1 and 7 may include a method of transmitting data from the mobile robot device to one or more user device according to implementations of the disclosed subject matter. At operation 26, the mobile robot device may receive, from at least one of the first user device and the one or more other user devices, a command to transmit data from at least one sensor of the mobile robot device. At operation 28, the data from the at least one sensor of the mobile robot device may be transmitted to at least one of the first user device and the one or more other user devices. That is, the first user device and/or the one or more other user device may select to receive data (e.g., images, video, data, audio signals, and the like) from one or more sensors of the mobile robot device.

Figure 5:
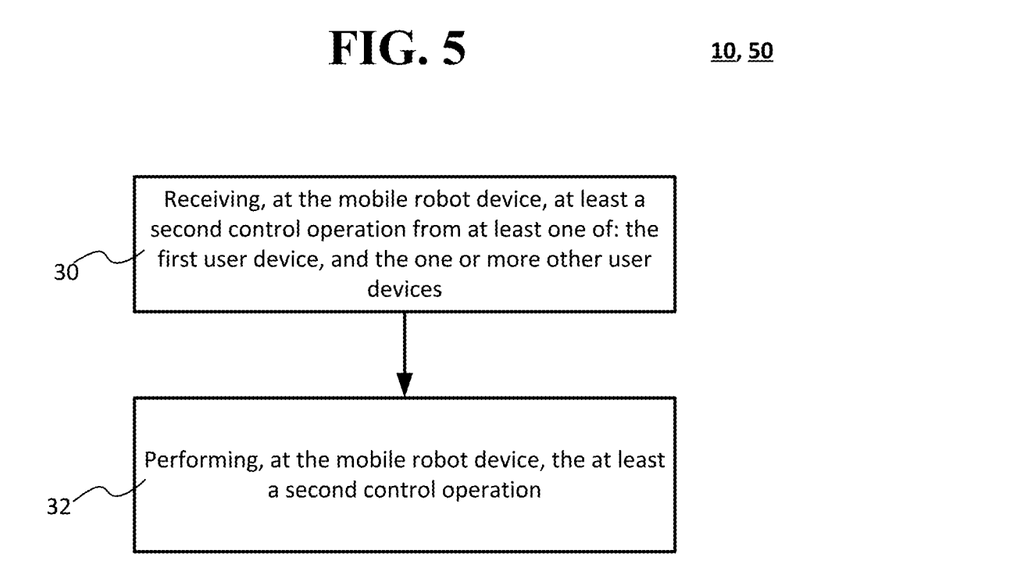
FIG. 5 shows that the methods of FIGS. 1 and 7 may include a method of the mobile robot device performing a received operation according to implementations of the disclosed subject matter.

FIG. 5 shows that the methods 10, 50 of FIGS. 1 and 7 may include a method of the mobile robot device performing a received operation according to implementations of the disclosed subject matter. At operation 30, the mobile robot device may receive at least a second control operation from the first user device, and/or the one or more other user devices. At operation 32, the mobile robot device may perform the at least a second control operation. The control operation may include, for example, moving the mobile robot device in the area, transmitting data from one or more sensors (e.g., sensors 102, 102b, 102c, and/or 102d, and/or microphone 103), outputting images and/or video received from the first user device and/or the one or more other user devices on a display (e.g., display 110 shown in FIGS. 9-11), and/or outputting an audio signal received from the first user device and/or the one or more other user devices with a speaker (e.g., speaker 107 shown in FIGS. 9-11). In some implementations, the method 10, 50 may include that the at least one first control operation may be a joint control operation by the first user device and the one or more other user devices. A joint control operation may include where the mobile robot device performs one or more control operations received from both the first user device and the one or more other user devices.

Figure 6:
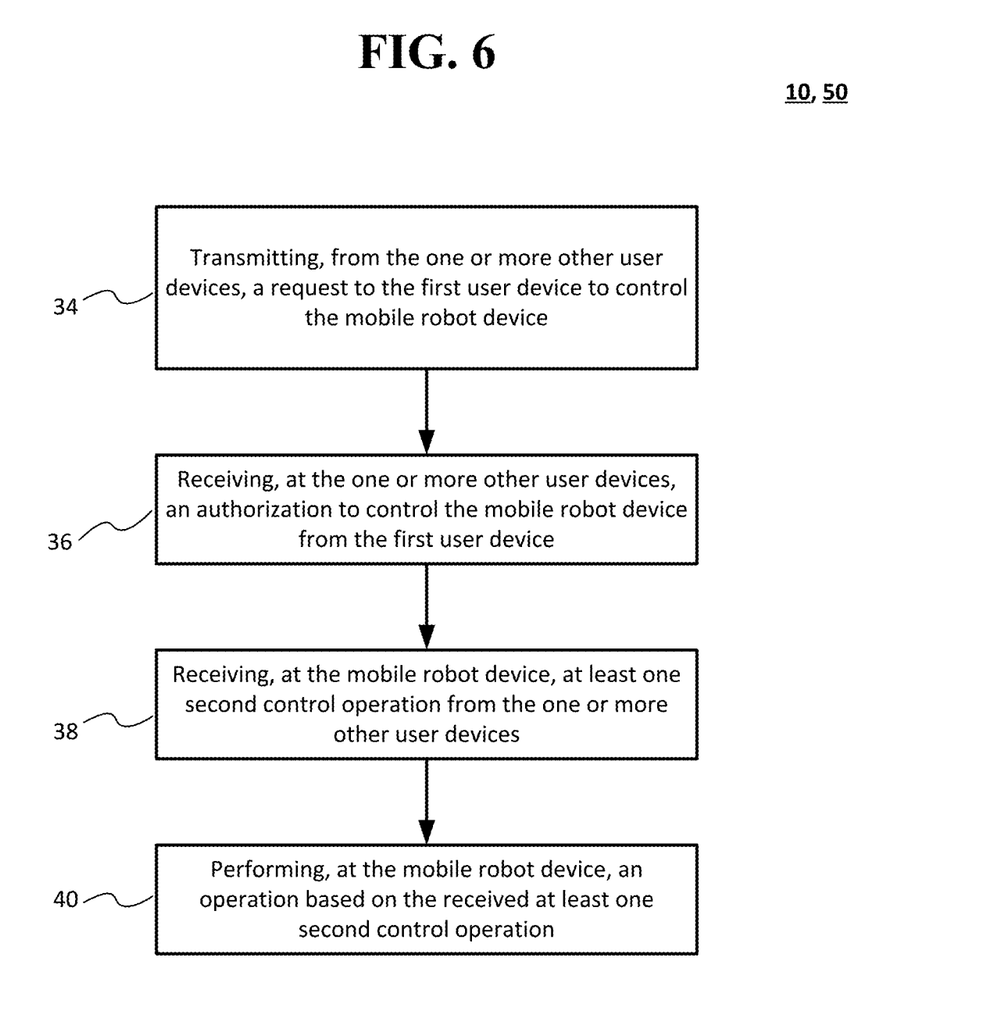
FIG. 6 shows that the methods of FIGS. 1 and 7 may include authorizing one or more other user devices to control the mobile robot device according to implementations of the disclosed subject matter.

FIG. 6 shows that the methods 10, 50 of FIGS. 1 and 7 may include authorizing the one or more other user devices to control the mobile robot device according to implementations of the disclosed subject matter. At operation 34, the one or more other user devices may transmit a request to the first user device to control the mobile robot device. At operation 36, the one or more other user devices may receive an authorization to control the mobile robot device from the first user device. At operation 38, the mobile robot device may receive at least one second control operation from the one or more other user devices. At operation 40, the mobile robot device may perform an operation based on the received at least one second control operation. That is, the first user device may authorize the one or more other user devices to control the operation of the mobile robot device. The control operation may be an operation to move the mobile robot device in the area, to transmit data from one or more sensors (e.g., sensors 102, 102b, 102c, and/or 102d, and/or microphone 103), to output images and/or video received from the first user device and/or the one or more other user devices on a display (e.g., display 110 shown in FIGS. 9-11), and/or to output an audio signal received from the first user device and/or the one or more other user devices with a speaker (e.g., speaker 107 shown in FIGS. 9-11).

In some implementations, the methods 10, 50 of FIGS. 1 and 7 may include outputting, at a speaker (e.g., speaker 107 shown in FIG. 11) of the mobile robot device, audio received from at least one of the first user device and the one or more other user devices received by the mobile robot device via the communications network. For example, the audio output at the speaker of the mobile robot device may include instructions to and/or dialog with one or more people near the mobile robot device.

In some implementations, the methods 10, 50 of FIGS. 1 and 7 may include displaying, on a display of the mobile robot device, an image of a first user received by the mobile robot device via the communications network from the first user device. For example, the user of the first user device may transmit an image of video of themselves to be displayed by the mobile robot device, so that one or more persons near the mobile robot device may determine who is operating the mobile robot device, and/or who may be outputting audio via the speaker in the form of instructions and/or dialog.

Similarly, in some implementations, a display (e.g., display 110 shown in FIGS. 9-11) of the mobile robot device may display an image of at least a second user received by the mobile robot device via the communications network from the one or more other user devices.

FIG. 7 shows an example method 50 of receiving, at the first user device that controls the mobile robot device, a request from the second user device to receive images captured by the mobile robot device according to an implementation of the disclosed subject matter according to an implementation of the disclosed subject matter. That is, in method 50, the one or more other user devices may request that the first user device grant authorizing to the one or more other user devices to receive the images captured by the mobile robot device. The methods shown in FIGS. 2-6 and described above may be additional operations of method 50 of FIG. 7.

At operation 52, the first user device (e.g., remote user device 170), via a communications network (e.g., network 130), may receive a request from one or more other user devices to receive one or more images captured by a sensor (e.g., sensor 102b, 102c) of the mobile robot device, where first user device controls the mobile robot device (e.g., mobile robot device 100 shown in FIGS. 9-12) to move within an area. At operation 54, the first user device may transmit, via the communications network, a request grant to the one or more other user devices (e.g., remote user device 180 shown in FIG. 12) to receive the one or more images captured by the sensor of the mobile robot. That is, the one or more other user devices may receive images, video, audio, and/or other sensor data from the mobile robot device when the first user device grants the request(s) of the one or more other user devices. At operation 56, the mobile robot device may transmit, to the first user device and the one or more other user devices based on the request grant, the one or more images captured by the sensor of the mobile robot as the mobile robot device moves within the area based on at least one first control operation received from the first user device. In some implementations, video signals, audio signals, and/or other sensor data may be transmitted to the first user device and/or the one or more other user devices.

In some implementations, the method 50 may include where at least one first control operation is a joint control operation by the first user device and the one or more other user devices. That is, a joint control operation may include where the mobile robot device performs one or more control operations received from both the first user device and the one or more other user devices. In some implementations, the speaker of the mobile robot device may output audio received from at least one of the first user device and the one or more other user devices received by the mobile robot device via the communications network. A display (e.g., display 110 shown in FIGS. 9-11) of the mobile robot device may display an image of a first user received by the mobile robot device via the communications network from the first user device. The display of the mobile robot device may display an image of at least a second user received by the mobile robot device via the communications network from the one or more other user devices.

Figure 8:
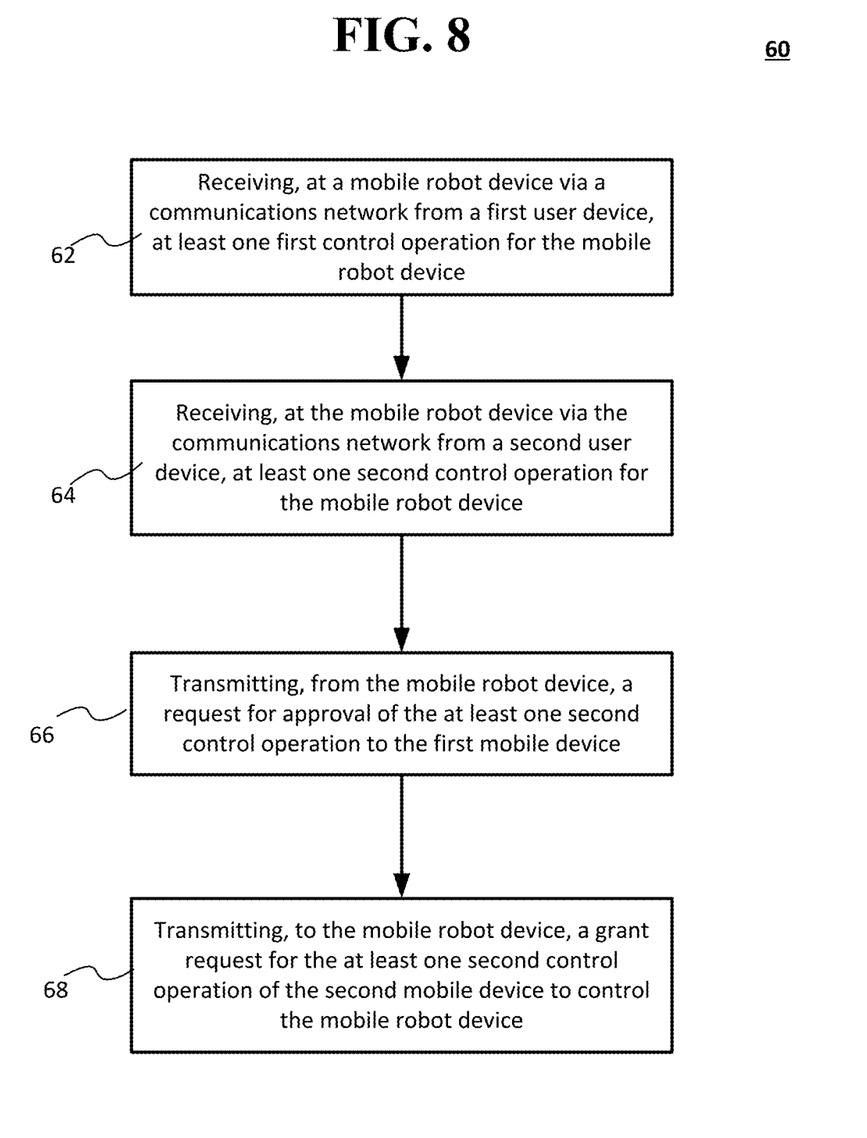
FIG. 8 shows an example method of the mobile robot device managing control operations received from different mobile devices according to an implementation of the disclosed subject matter.

FIG. 8 shows an example method 60 of the mobile robot device managing control operations received from different mobile devices according to an implementation of the disclosed subject matter. At operation 62, that mobile robot device may receive, via a communications network from a first user device, at least one first control operation for the mobile robot device. At operation 64, the mobile robot device may receive, via the communications network from a second user device, at least one second control operation for the mobile robot device. The first and/or second control operations may be movement operations, operations to display images and/or video, operations to output an audio signal, operations to transmit data from one or more sensors of the mobile robot device, and the like. At operation 66, the mobile robot device may transmit a request for approval of the at least one second control operation to the first mobile device. At operation 68, a grant request may be transmitted to the mobile robot device for the at least one second control operation of the second mobile device to control the mobile robot device.

FIGS. 9-10 show an example mobile robot device 100 according to an implementation of the disclosed subject matter. The mobile robot device 100 may have a plurality of sensors. Sensor 102a may be a time-of-flight sensor. Sensor 102b may be a RGB (a Red, Green, Blue image sensor) camera and/or image sensor, and sensor 102c may be a RGB-D (a RGB depth camera). In some implementations, sensor 102b, 102c may be a stereo vision sensor, 3D camera, an image sensor, thermal camera, a structured light camera, or the like. Sensor 102d may be an a two-dimensional (2D) Light Detection and Ranging (LiDAR) sensor, a three-dimensional (3D) LiDAR sensor, and/or a radar (radio detection and ranging) sensor, ultrasonic sensor, or the like.

The mobile robot device 100 may include at least one microphone 103. In some implementations, the mobile robot device 100 may have a plurality of microphones 103 arranged in an array.

The mobile robot device 100 may include an light emitting diode (LED), organic light emitting diode (OLED), lamp, and/or any suitable light source that may be controlled by the controller (e.g., controller 114 shown in FIG. 11) to illuminate a portion of the area for navigation of the mobile robot device.

The mobile robot 100 may include a motor to drive the drive system 108 to move the mobile robot in an area, such as a room, a building, or the like. The drive system 108 may include wheels, which may be adjustable so that the drive system 108 may control the direction of the mobile robot 100.

The mobile robot device 100 may include one or more speakers 107. In some implementations, such as shown in FIG. 10, speakers 107 may be disposed on first and second sides (e.g., left and right sides) of display 110. The display 110 may be a LCD (liquid Crystal Display), an OLED display, or the like to display images, such as those received from the remote user device 170.

FIG. 11 shows example components of the mobile robot 100 suitable for providing the implementations of the disclosed subject matter. The mobile robot 100 may include a bus 122 which interconnects major components of the mobile robot 100, such as the drive system 108, a network interface 116 operable to communicate with one or more remote devices via a suitable network connection, the controller 114, a memory 118 such as Random Access Memory (RAM), Read Only Memory (ROM), flash RAM, or the like, the LED light source 104, sensor 102a, sensor 102b, sensor 102c, sensor 102d, a user interface 110 that may include one or more controllers, a display and associated user input devices such as a touch screen, a fixed storage 120 such as a hard drive, flash storage, and the like, a microphone 103, and a speaker 107 to output an audio notification and/or other information.

The bus 122 allows data communication between the controller 114 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the mobile robot 100 are generally stored on and accessed via a computer readable medium (e.g., fixed storage 120), such as a solid state drive, hard disk drive, an optical drive, solid state drive, or other storage medium.

The network interface 116 may provide a direct connection to a remote server (e.g., server 140, database 150, remote platform 160, and/or remote user device 170 shown in FIG. 11) via a wired or wireless connection (e.g., network 130 shown in FIG. 11). The network interface 116 may provide such connection using any suitable technique and protocol as will be readily understood by one of skill in the art, including digital cellular telephone, WiFi, Bluetooth®, near-field, and the like. For example, the network interface 116 may allow the mobile robot 100 to communicate with other computers via one or more local, wide-area, or other communication networks, as described in further detail below. The mobile robot may transmit data via the network interface to the remote user device, including data and/or images from the sensors, audio signal generated from sound captured by the microphone, and the like.

Many other devices or components (not shown) may be connected in a similar manner. Conversely, all of the components shown in FIG. 11 need not be present to practice the present disclosure. The components can be interconnected in different ways from that shown. Code to implement the present disclosure can be stored in computer-readable storage media such as one or more of the memory 118, fixed storage 120, or on a remote storage location.

Figure 12:
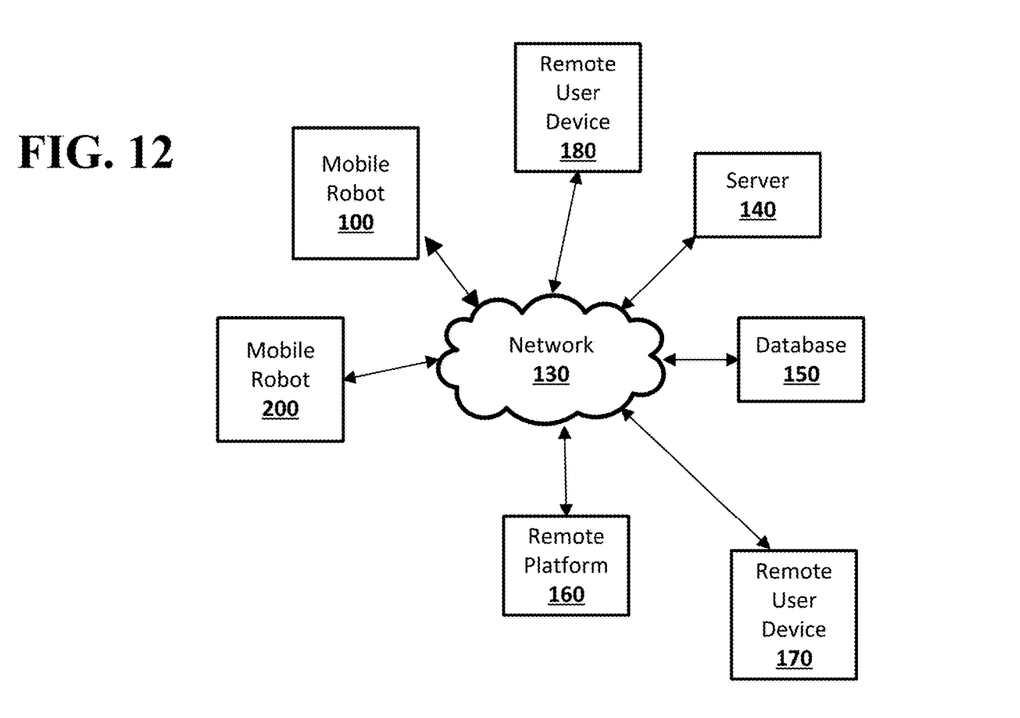
FIG. 12 shows a network configuration which may include a plurality of mobile robots according to implementations of the disclosed subject matter.

FIG. 12 shows an example network arrangement according to an implementation of the disclosed subject matter. The mobile robot 100 described above, and/or a similar mobile robot 200, may connect to other devices via network 130. The network 130 may be a local network, wide-area network, the Internet, or any other suitable communication network or networks, and may be implemented on any suitable platform including wired and/or wireless networks. The mobile robot 100 and/or mobile robot 200 may communicate with one another, and/or may communicate with one or more remote devices, such as server 140, database 150, remote platform 160, remote user device 170, and/or remote user device 180. The remote user device 170 may be a first user device described above, and the remote user device 180 may be the one or more other user devices described above. The remote devices may be directly accessible by the mobile robot 100, 200 or one or more other devices may provide intermediary access such as where a server 140 provides access to resources stored in a database 150. The mobile robot 100, 200 may access remote platform 160 or services provided by remote platform 160 such as cloud computing arrangements and services. The remote platform 160 may include one or more servers 140 and/or databases 150. The remote user device 170, 180 may control mobile robot 100, 200 and/or receive sensor data, one or more images, audio signals and the like via the network 130. The remote user device 170, 180 may transmit one or more images, video, commands, audio signals, and the like to the mobile robot 100, 200.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as solid state drives, DVDs, CD-ROMs, hard drives, USB (universal serial bus) drives, or any other machine readable storage medium, such that when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing implementations of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may include using hardware that has a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
transmitting from a first user device, via a communications network, an authorization to a second user device of one or more other user devices to receive one or more images captured by a first sensor of a mobile telepresence robot device, wherein the first user device controls operations of the mobile telepresence robot device and authorizes the second user device of the one or more other user devices to receive the one or more images;
receiving, at the first user device via the communications network, an acknowledgement from the second user device of the one or more other user devices to receive the one or more images captured by the first sensor of the mobile telepresence robot device;
transmitting, from the mobile robot device to the first user device and the second user device of the one or more other user devices based on the acknowledgement, the one or more first images captured by the first sensor of the mobile telepresence robot device as the mobile telepresence robot device moves within the area based on at least one first control operation received from the first user device;
receiving, at the mobile telepresence robot device, at least a second control operation from the second user device of the one or more other user devices; and
performing, at the mobile telepresence robot device, the second control operation,
wherein the first user device and the second user device jointly control the mobile telepresence robot with the first control operation and the second control operation.

2. The method of claim 1, further comprising:
receiving, at the mobile telepresence robot device from at least one of the first user device and the second user device of the one or more other user devices, a command to select a portion of the one or more image; and transmitting, to at least one of the first user device and the second user device the one or more other user devices, the selected portion of the one or more images.

3. The method of claim 1, further comprising:
receiving, at the mobile telepresence robot device from at least one of the first user device and the second user device of the one or more other user devices, a command to transmit one or more second images from a second sensor; and
transmitting, to at least one of the first user device and the second user device of the one or more other user devices, the one or more second images from the second sensor.

4. The method of claim 1, further comprising:
receiving, at the mobile telepresence robot device from at least one of the first user device and the second user device of the one or more other user devices, and a command to transmit data from at least one sensor of the mobile telepresence robot device; and
transmitting, to at least one of the first user device and the second user device of the one or more other user devices, the data from the at least one sensor of the mobile telepresence robot device.

5. The method of claim 1, further comprising:
transmitting, from the second user device of the one or more other user devices, a request to the first user device to control the mobile telepresence robot device; and
receiving, at the second user device of the one or more other user devices, an authorization to control the mobile telepresence robot device from the first user device.

6. The method of claim 5, further comprising:
receiving, at the mobile telepresence robot device, at least one second control operation from the second user device of the one or more other user devices; and
performing, at the mobile telepresence robot device, an operation based on the received at least one second control operation.

7. The method of claim 1, further comprising:
outputting, at a speaker of the mobile telepresence robot device, audio received from at least one of the first user device and the second user device of the one or more other user devices received by the mobile telepresence robot device via the communications network.

8. The method of claim 1, further comprising:
displaying, on a display of the mobile telepresence robot device, an image of a first user received by the mobile telepresence robot device via the communications network from the first user device.

9. The method of claim 1, further comprising:
displaying, on a display of the mobile telepresence robot device, an image of at least a second user received by the mobile robot device via the communications network from the second user device of the one or more other user devices.

10. A method comprising:
receiving at a first user device, via a communications network, a request from a second user device of one or more other user devices to receive one or more images captured by a sensor of a mobile telepresence robot device, wherein first user device controls operations of the mobile telepresence robot device to move within an area and authorizes the second user device of the one or more other user devices to receive the one or more images;

transmitting, at the first user device via the communications network, a request grant to authorize the second user device of the one or more other user devices to receive the one or more images captured by the sensor of the mobile telepresence robot device;
transmitting, from the mobile telepresence robot device to the first user device and the second user device of the one or more other user devices based on the request grant, the one or more images captured by the sensor of the mobile telepresence robot device as the mobile telepresence robot device moves within the area based on at least one first control operation received from the first user device;
receiving, at the mobile telepresence robot device, at least a second control operation from the second user device of the one or more other user devices; and
performing, at the mobile telepresence robot device, the second control operation,
wherein the first user device and the second user device jointly control the mobile telepresence robot with the first control operation and the second control operation.

11. The method of claim 10, further comprising:
receiving, at the mobile telepresence robot device from at least one of the first user device and the second user device of the one or more other user devices, a command to select a portion of the one or more image; and
transmitting, to at least one of the first user device and the second user device of the one or more other user devices, the selected portion of the one or more images.

12. The method of claim 10, further comprising:
receiving, at the mobile telepresence robot device from at least one of the first user device and the second user device of the one or more other user devices, a command to transmit one or more second images from a second sensor; and
transmitting, to at least one of the first user device and the second user device of the one or more other user devices, the one or more second images from the second sensor.

13. The method of claim 10, further comprising:
receiving, at the mobile telepresence robot device from at least one of the first user device and the second user device of the one or more other user devices, and a command to transmit data from at least one sensor of the mobile telepresence robot device; and
transmitting, to at least one of the first user device and the second user device of the one or more other user devices, the data from the at least one sensor of the mobile telepresence robot device.

14. The method of claim 10, further comprising:
transmitting, from the second user device of the one or more other user devices, a request to the first user device to control the mobile telepresence robot device; and
receiving, at the second user device of the one or more other user devices, an authorization to control the mobile telepresence robot device from the first user device.

15. The method of claim 14, further comprising:
receiving, at the mobile telepresence robot device, at least one second control operation from the second user device of the one or more other user devices; and
performing, at the mobile telepresence robot device, an operation based on the received at least one second control operation.

16. The method of claim 10, further comprising:
outputting, at a speaker of the mobile telepresence robot device, audio received from at least one of the first user device and the second user device of the one or more other user devices received by the mobile telepresence robot device via the communications network.

17. The method of claim 10, further comprising:
displaying, on a display of the mobile telepresence robot device, an image of a first user received by the mobile robot device via the communications network from the first user device.

18. The method of claim 10, further comprising:
displaying, on a display of the mobile telepresence robot device, an image of at least a second user received by the mobile robot device via the communications network from the second user device of the one or more other user devices.

19. A method comprising:
receiving, at a mobile telepresence robot device via a communications network from a first user device, at least one first control operation for the mobile telepresence robot device;

receiving, at the mobile telepresence robot device via the communications network from a second user device, at least one second control operation for the mobile telepresence robot device; and transmitting, from the mobile telepresence robot device, a request for approval of the at least one second control operation to the first mobile device that controls the operation of the mobile telepresence robot device and authorizes the second user device to perform the at least one second control operation;

transmitting, to the mobile telepresence robot device, a grant request for the at least one second control operation of the second mobile device to control the mobile telepresence robot device;

receiving, at the mobile telepresence robot device, at least a second control operation from a second user device of the one or more other user devices; and performing, at the mobile telepresence robot device, the second control operation, wherein the first user device and the second user device jointly control the mobile telepresence robot with the first control operation and the second control operation.

\* \* \* \* \*